April 30, 1935.　　　A. DUEZ ET AL　　　1,999,627
JACK ATTACHMENT
Filed Feb. 11, 1932　　　4 Sheets-Sheet 1
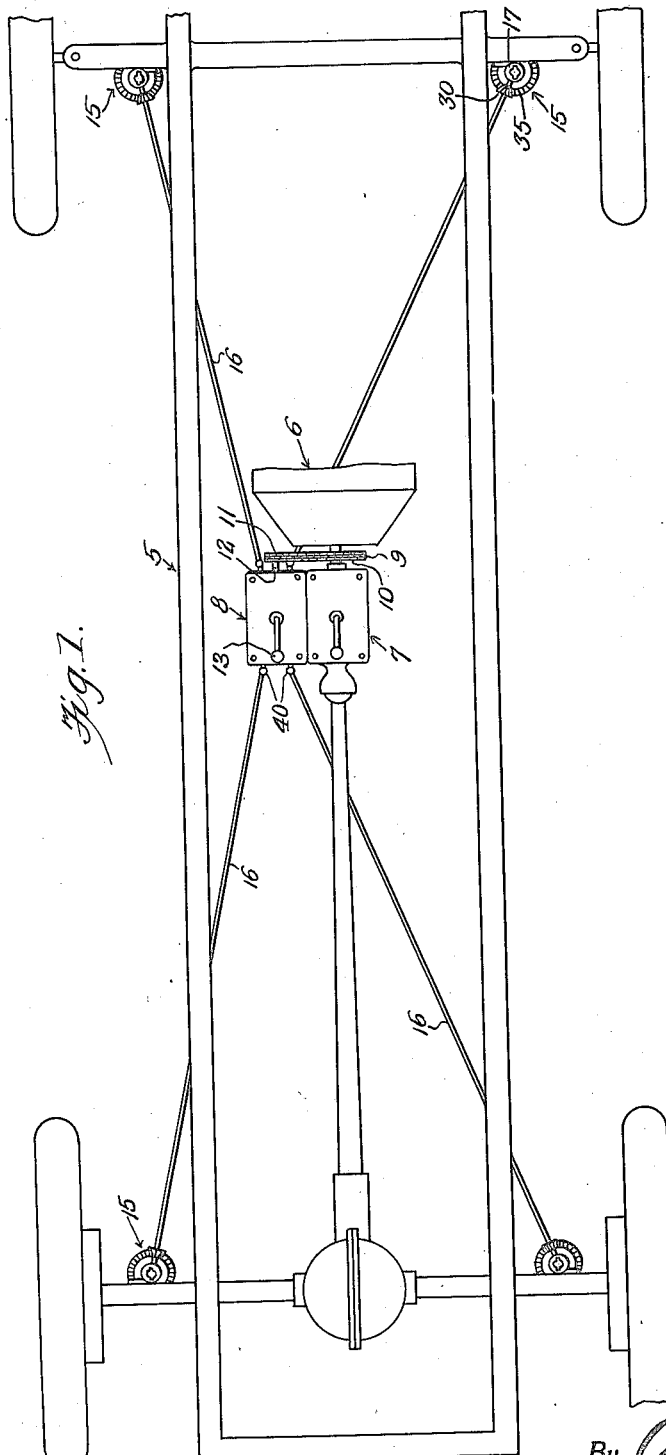
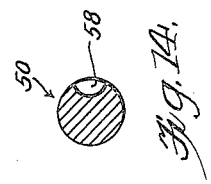
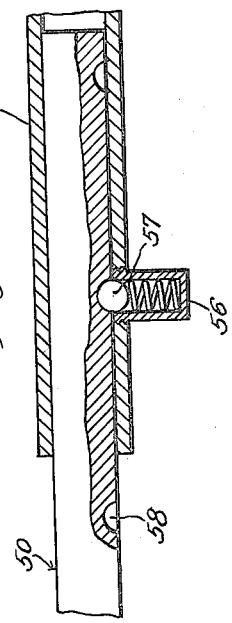
Inventors
*August Duez,
August Dupage,*
By *Clarence A. O'Brien*
　　Attorney

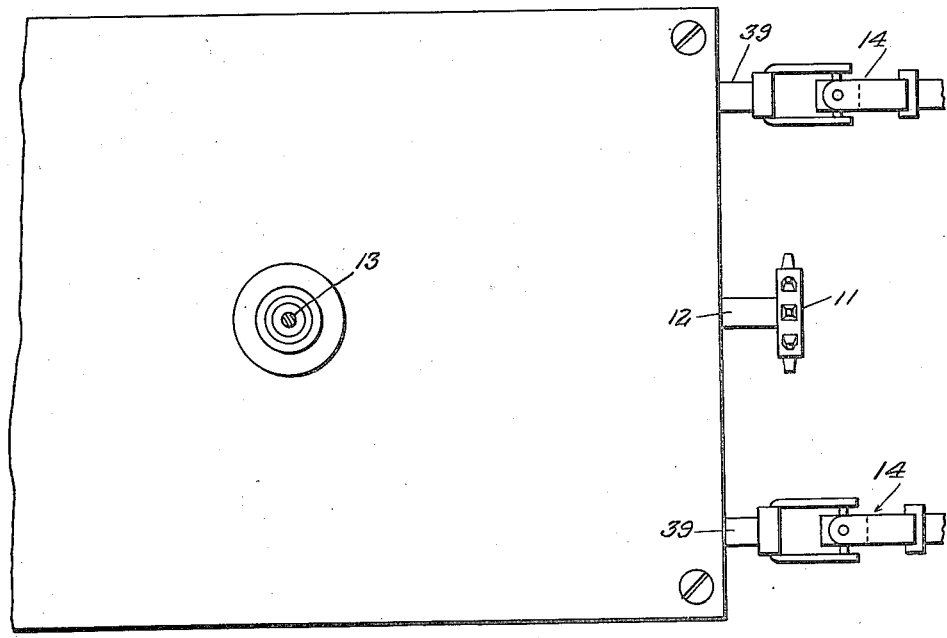
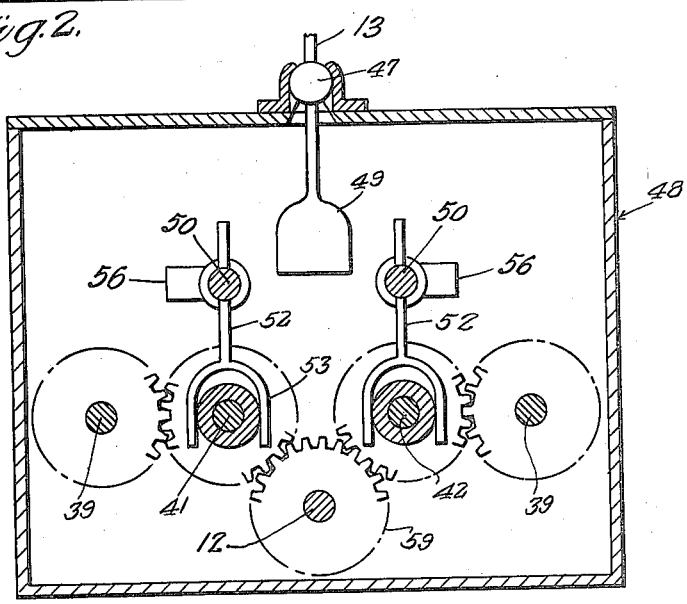
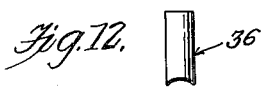

April 30, 1935.  A. DUEZ ET AL  1,999,627
JACK ATTACHMENT
Filed Feb. 11, 1932   4 Sheets-Sheet 3
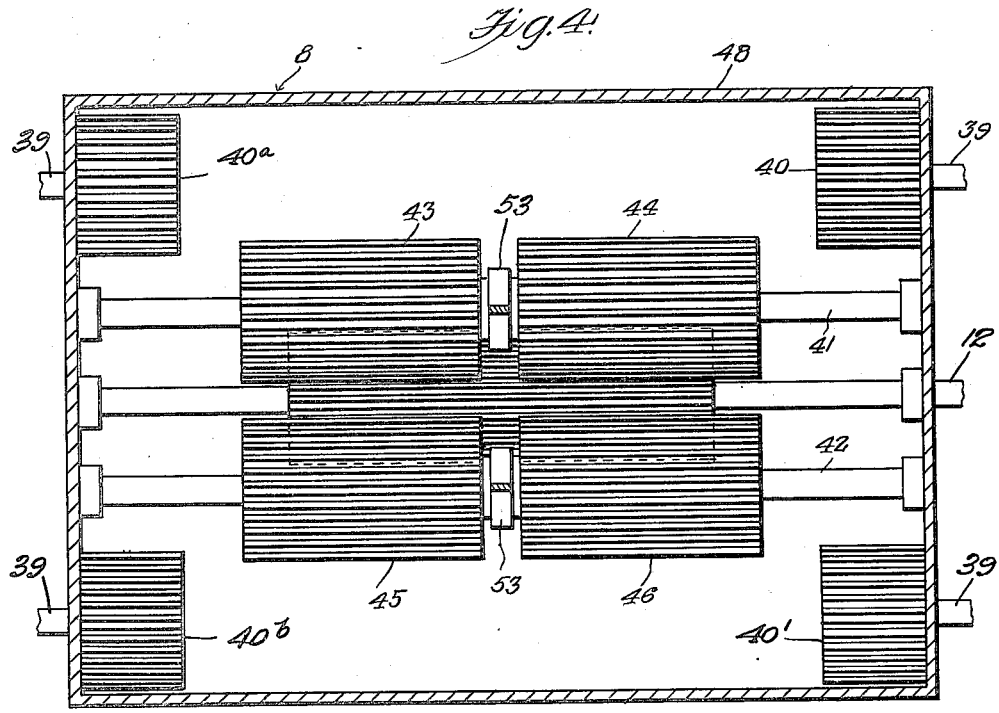
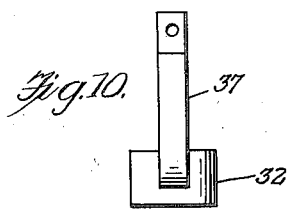
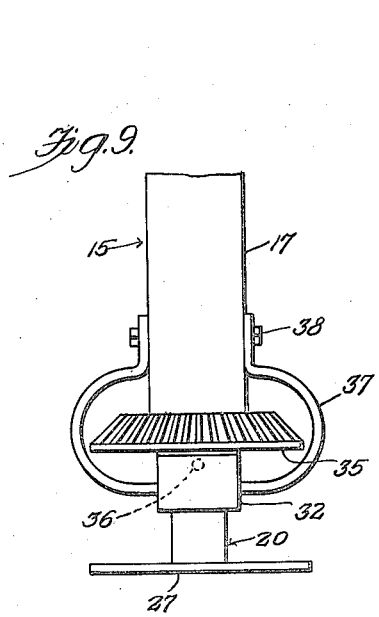
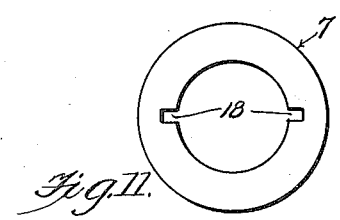
Inventors
August Duez,
August Dupage,
By Clarence A. O'Brien
Attorney

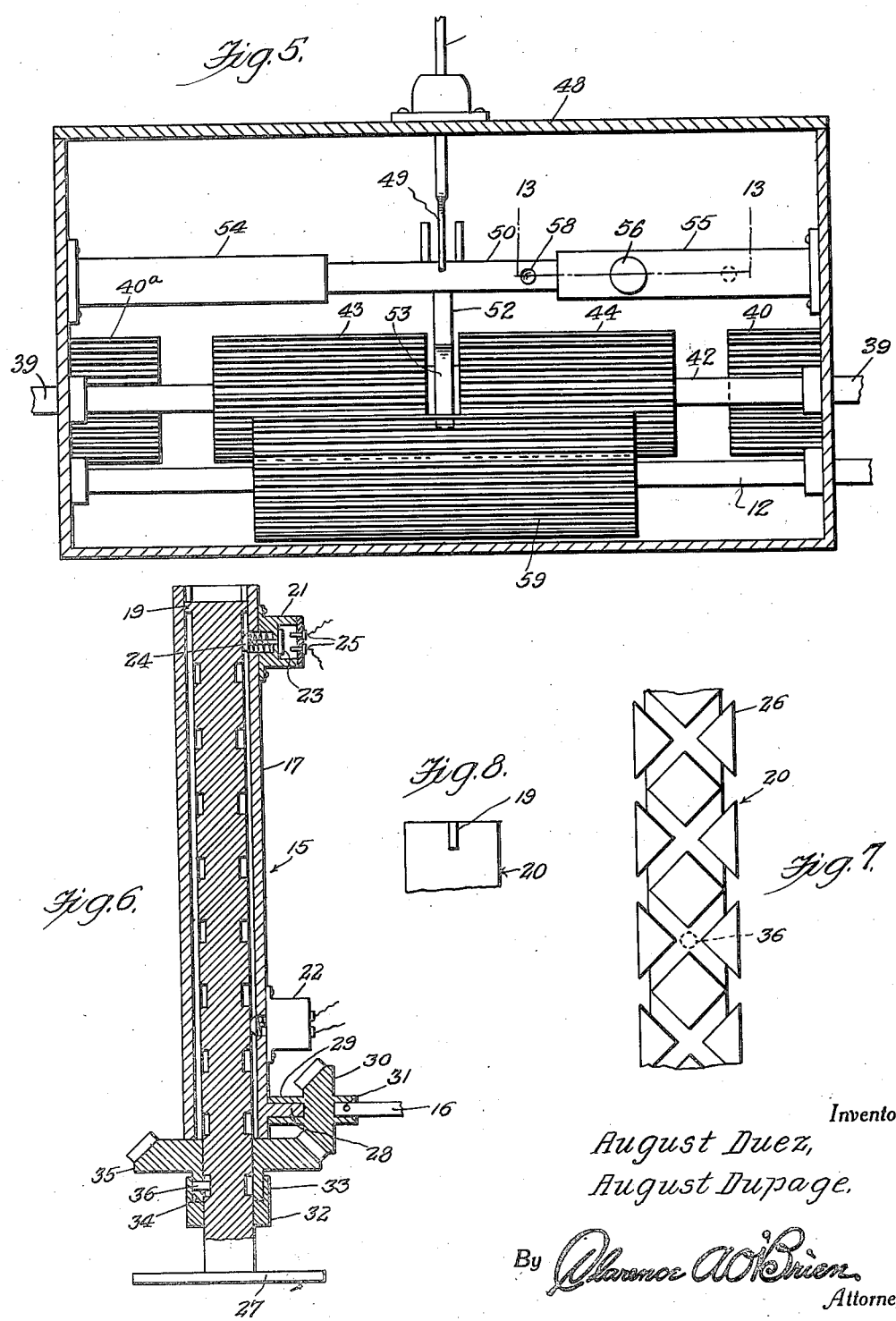

Patented Apr. 30, 1935

1,999,627

UNITED STATES PATENT OFFICE 1,999,627

JACK ATTACHMENT

August Duez and August Dupage, Tovey, Ill.

Application February 11, 1932, Serial No. 592,310

6 Claims. (Cl. 254—86)

The invention relates to improvements in jacks, particularly for vehicles, and relates specifically to a jack structure for a motor vehicle which is driven from an operative connection with the motor of the vehicle.

It is an object of the invention to provide a simplified structure of the type described comprising a separate jack for each of the wheels of the vehicle being selectively connectible by means of a transmission driven by the motor of the vehicle, whereby any one of the jacks may be independently projected and retracted under the control of the operator of the vehicle without reversing the drive from the motor of the vehicle.

It is also an important object of the invention to provide indicator means in a device of this kind operable by each jack to inform the operator of the extended or retracted condition of any of the jacks.

It is also an important object of the invention to provide a structure of the type described which can be easily and comparatively inexpensively manufactured and installed, and which will not become easily disarranged.

Other objects and advantages of the invention will be apparent from a reading of the following description of the drawings wherein for purposes of illustration I have shown a preferred embodiment of the invention.

In the drawings:—

Figure 1 is a top plan view of a vehicle showing mounted thereon an embodiment of the invention.

Figure 2 is a fragmentary top plan view of the transmission of the invention and appurtenances.

Figure 3 is a transverse vertical sectional view through Figure 2 showing diagrammatically the location of the various shafts and gears thereof.

Figure 4 is a horizontal sectional view taken through the upper part of the transmission casing showing in top plan the interior mechanism of the transmission.

Figure 5 is a vertical longitudinal sectional view through Figure 4 taken on a plane passing through a central part of the transmission casing.

Figure 6 is a vertical transverse sectional view through one of the jacks.

Figure 7 is a side elevational view of the jack screw element.

Figure 8 is an elevational view of the top of the element shown in Figure 7.

Figure 9 is an elevational view of the lower part of the jack shown in Figure 6.

Figure 10 is a side elevational view taken at right angles to Figure 9 of the retaining means for the lower gear of the jack.

Figure 11 is a top plan view of the jack casing.

Figure 12 is a view of the jack screw engaging key or pin mounted in connection with the lower gear of the jack.

Figure 13 is a fragmentary longitudinal horizontal sectional view taken approximately on the line 13—13 of Figure 5.

Figure 14 is a transverse vertical sectional view taken through Figure 13 showing the contour of the slidable shaft and of one of the detent receiving depressions therein.

In the drawings wherein like numerals refer to like parts throughout the same, the numeral 5 refers generally to a motor vehicle chassis carrying the motor driven clutch mechanism generally designated 6 behind which is the usual transmission 7. Suitably mounted to one side of the regular transmission 7 is the jack transmission generally designated 8 which forms part of the invention. It will be seen that the main shaft of the transmission 8 has sprocket wheel 11 which is driven by means of a chain 9 trained over a sprocket wheel 10 mounted on the vehicle drive shaft between the regular transmission 7 and the clutch mechanism 6. The numeral 13 designates the shift lever for the jack transmission 8.

The idea of the invention is to provide adjacent each wheel of the vehicle individual jacks each of which is generally designated 15, each jack to be operatively connected with the transmission 8 by means of a flexibly connected shaft 16.

Each jack consists of the tubular casing 17 having oppositely disposed vertical interior grooves 18 in which slide lugs 19 formed upon the upper end of the diamond cut screw element of the jack which is generally designated 20. The screw 20 is of a diameter smaller than the interior diameter of the casing 17 and is arranged therein as shown in Figure 6.

Vertically spaced on one side of the casing 17 there is arranged a pair of vertically spaced switches 21, 22 each of which has a spring projected contact member 23 which acts to push a ball contact 24 in one of the vertical grooves 18 in the casing 17 into contact with the screw element 20. The contact member 23 is adapted to bridge a pair of contacts 25 when pushed outwardly by the diamond shaped projections 26 of the screw 20. The object of providing the vertically spaced switches 21, 22 is to indicate by means of a light or other alarm convenient to the operator of the vehicle, the condition of projection of the jack being operated at the time.

The lower end of the screw member 20 is equipped with a foot 27 adapted to engage the ground. The casing 17 is adapted to climb the screw member 20 when the jack is operated, whereby to lift the wheel of the vehicle from the ground. Rotation of the shafts 16 is arranged for either direction, so as to retract or project the jacks.

At the lower part of the casing 17 there is laterally projected a stub shaft 28 upon which the hollow stem 29 of a beveled pinion 30 is journaled. The gear wheel 30 has a socket receiving the end of the respective shaft 16 wherein the end of the shaft is held by a pin 31.

Slidably mounted upon the lower part of the jack screw is a ferrule 32 having upper walls 33 annularly spaced from the screw member 20 in order to carry between the screw and the said walls a sleeve portion 34 depending from a large beveled gear 35 in mesh with the bevel pinion 30. The sleeve portion 34 of the large gear 35 is provided with a pin or key 36 for engaging the channels between the diamond shaped projections 26 of the screw member 20. Of course, the large gear wheel 35 as well as the casing 17 moves relative to the screw member 20 when the jack is operated by rotating the shaft 16. The ferrule 32 is provided with a pair of oppositely disposed brackets 37 secured as indicated at 38 to the outside of the jack casing 17, and outwardly diverging so as to be spaced from the large gear 35. It will be obvious that when the jack screw has reached an extreme position and the rotation of the related shaft 16 is continued the jack screw will be pushed in the opposite direction because of the acutely angular criss-cross form of the grooves therein with which the pin 36 is engaged.

The transmission generally designated by the numeral 8 comprises an appropriate casing 38 adapted to be attached alongside of or at any convenient position relative to the clutch mechanism and regular transmission of the vehicle upon which the device is to be installed. The casing 8 is preferably rectangular in form and longitudinally elongated. Within the respective corners thereof are arranged horizontal axles 39 journaled in the end walls of the casing. The shafts 39 are flexibly connected by means of the universal joints 14 with the jack shafts 16. On the ends of the shafts 39 and within the casing 8 are short pinions 40.

Parallel with a line through the center of the transmission casing and spaced from this line are shafts 41 and 42 located in the same horizontal plane. The plane of the shafts 41 and 42 is substantially that of the shafts 39. Upon the shafts 41, 42 are pairs of longitudinally spaced elongated gears 43, 44 and 45, 46, respectively, the gears of each pair being adapted to be shifted either forwardly or rearwardly together so as to mesh with the respective one of the front pinions 40 and 40' and demesh from the rear pinions 40a and 40b or vice versa, or to assume intermediate neutral positions.

Shift means for shifting the pairs of gears 43, 44 and 45 and 46, comprises a suitable manual lever 47 supported by and passing through the top 48 of the casing and provided with a suitable arm 49 depending between and operatively engageable with slidable shafts 50, which are in turn equipped with suitable depending forks whose branches are indicated at 52, 53, shown in Figure 4. The arrangement is such that shifting the lever 47 forwardly or rearwardly and to one side or the other manages the shifting of any one of the gears 43, 44 or 45, 46 so that operative connection with the selected one of the pinion gears 40, 40', 40a, and 40b corresponding to the jack which it is desired to operate is made. The slidable shafts 50 are mounted by sleeves 54, 55 fixed to the respective ends of the casing 8, each of said sleeves being provided with one or more dash pots 56 enclosing a spring projected ball detent 57 for engagement in one at a time of a plurality of hemispherical depressions 58 in one side of the shafts 50, whereby to yieldably lock the shafts 50 in positions to which they may be shifted.

Means for driving the pairs of gears 43, 44, and 45, 46 is provided in the long gear 59 which is mounted on the main shaft 12 which projects from the forward end of the casing where it is equipped with the sprocket wheel 11, which as already stated is operatively connected by a chain 9 with the sprocket wheel 10 mounted on the vehicle power shaft. It will be observed that the gear 59 is sufficiently long to remain constantly engaged with the gears 40, 40', 40a and 40b. The jacks may be attached to the vehicle axles in any desirable manner.

Though we have shown and described herein a preferred embodiment of the invention, it is to be definitely understood that we do not desire to limit the application of this invention thereto, but any change or changes may be made in material and in structure, consistent with the spirit of the invention and the scope of the subjoined claims.

What is claimed is:—

1. The combination with a motor vehicle having a clutch equipped motor, and a power shaft, of a jack transmission, a driving member in the transmission, an operating connection between the power shaft and the driving member, a plurality of jacks on the vehicle, an operating member for each jack extending to and operatively connectible to the driving member, a stationary rotatable gear in the jack transmission for each one of the operating members, and shiftable gear means in the jack transmission constantly engaged with the driving member and movable for selectively and operatively engaging any one of said stationary gears and single lever means for selectively shifting the shiftable gear means.

2. A device of the character described comprising four jacks each having a rotatable operating shaft, a selector transmission including a power-driven shaft, an elongated gear on said power-driven drive shaft, a pair of transversely spaced driven shafts on two opposite sides of said drive shaft each carrying slidable and rotatable elongated gear means constantly meshed with said elongated gear, a pair of longitudinally spaced relatively short gears at said opposite sides of the drive shaft with which said elongated gear means is arranged to be selectively engaged, each of said short gears being connected to a corresponding rotatable jack operating shaft, and means for selectively engaging said elongated gear means with said short gears.

3. In a jack mechanism, four jacks each operated by a rotary member, a transmission having four short gears connected to the corresponding rotary members, a powered drive shaft carrying a long gear on opposite sides of which two of said short gears are arranged in longitudinally spaced manner, a pair of transversely spaced shafts arranged one on each of said opposite sides of the drive shaft, elongated gear means rotatable and slidable on each of said shafts and constantly meshed with said long gear, each of said elongated gear means being arranged to be slid on its shaft into and out of mesh with either one of the short gears corresponding thereto, and means connected with said gear means for selectively meshing the same with said short gears and demeshing the same therefrom.

4. An arrangement of jacks one of which is secured to each of the front and rear corners of an automobile having a motor driven shaft and a transmission operated thereby, said arrangement including a driven shaft operatively connected to said motor driven shaft and having a long gear fixed thereon, a casing mounted adjacent said transmission and containing said long gear, said casing also containing a pair of front rotatable shafts and a pair of rear rotatable shafts, the last mentioned shafts being operatively connected to the respective jacks, a short gear fixed on each of said last-mentioned shafts, a pair of shafts in said casing each having gear means slidable thereon and constantly in mesh with said long gear, means mounted on said casing and engageable with either one of said gear means and operable to move the same into or out of mesh with the corresponding front or the corresponding rear short gear, or into a neutral position.

5. An arrangement of jacks one of which is secured to each of the front and rear corners of an automobile having a motor driven shaft and a transmission operated thereby, said arrangement including a driven shaft operatively connected to said motor driven shaft and having a long gear fixed thereon, a casing mounted adjacent said transmission and containing said long gear, said casing also containing a pair of front rotatable shafts and a pair of rear rotatable shafts, the last-mentioned shafts being operatively connected to the respective jacks, a short gear fixed on each of said last-mentioned shafts, a pair of shafts in said casing each having gear means slidable thereon and constantly in mesh with said long gear, means mounted on said casing and operatively engageable with either one of said gear means to move the same into or out of mesh with the corresponding front or the corresponding rear short gear, or into a neutral position, each of said jacks containing a reversing screw arranged so that when the jack has been fully extended and operative rotation of the corresponding rotatable shaft is continued the jack will be retracted.

6. An arrangement for extending or retracting automobile jacks independently of each other where said jacks are connected individually to the respective left and right front and left and right rear portions of the automobile and the automobile has a shaft rotated by its motor, said arrangement including a driven shaft operatively connected to the first mentioned shaft and having a long gear fixed thereon, a casing journalling said driven shaft and containing said long gear, a pair of sliding shafts supported in said casing parallelly to said driven shaft each having gear means slidable relative to and in constant mesh with said long gear, jack shafts each having a portion journaled within said casing and a portion extending from said casing and operatively connected to the respective one of said jacks, a short gear fixed on said portion of each jack shaft, the front and rear left jack shafts being axially aligned, and the front and rear right jack shafts being aligned, and manual means engageable with either of said sliding shafts to slide the same from an intermediate neutral position either forwardly or rearwardly while said long gear is rotating, so as to mesh with and operate the corresponding short gear and the jack operatively connected thereto.

AUGUST DUEZ.
AUGUST DUPAGE.